Feb. 27, 1923.  L. BELL ET AL  1,446,634
PHOTOGRAPHIC LENS
Filed Jan. 4, 1921
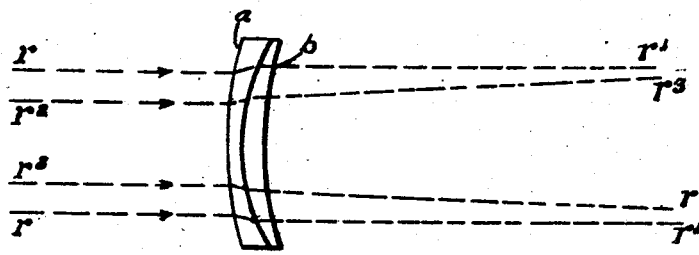
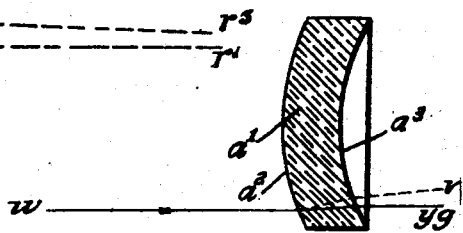
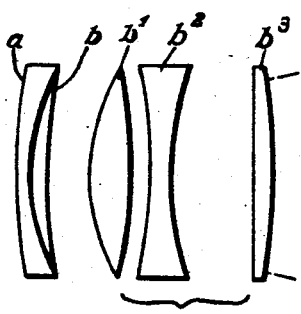
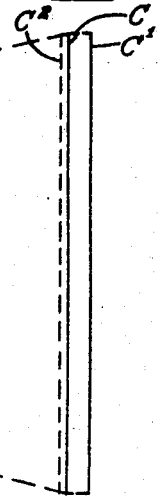
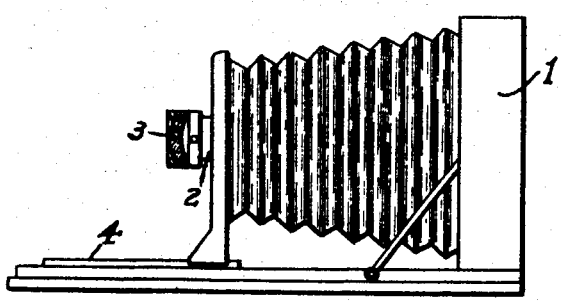
Inventors
Louis Bell
Walter G. Wolfe
By
Attorney Patented Feb. 27, 1923.

1,446,634

UNITED STATES PATENT OFFICE.

LOUIS BELL, OF NEWTON, AND WALTER W. WOLFE, OF GREENWOOD, MASSACHUSETTS.

PHOTOGRAPHIC LENS.

Application filed January 4, 1921. Serial No. 434,922.

*To all whom it may concern:*

Be it known that we, LOUIS BELL and WALTER G. WOLFE, citizens of the United States, residing at Newton, county of Middlesex, Commonwealth of Massachusetts, and Greenwood, county of Middlesex, Commonwealth of Massachusetts, respectively, have invented certain new and useful Improvements in Photographic Lenses, of which the following is a specification.

Our invention relates to the construction of lenses adapted to the uses of so-called pictorial photography and its object is to provide for use in combination with photographic lenses of the ordinary sort, an auxiliary lens structure which without change of the back focus of the system for the visual rays by which focus is customarily determined shall modify in character the resulting image to correspond the more nearly with the scene as viewed by the human eye.

The desideratum in photographic lenses has generally been considered to be an exact point by point reproduction upon the plane of the photographic plate of all objects situated in a plane conjugate thereto in front of the lens over the widest practicable angle. To this end lens constructions have been modified to procure the flattest possible image surface free of aberrations over angles of 50 or 60 degrees or more, with the sharpest possible definition all over the field. Particularly the anastigmatic class of lenses has been widely used in which such corrections have been carried to extreme precision. The pictures produced by such lenses while meeting extraordinarily well the requirement of the point to point representation of one plane upon another do not represent the scene as the eye views it and hence frequently failed of giving correct pictorial image when objects situated in widely different planes are included.

The eye sees objects none too sharply even in a single plane over a limited angular area, being affected by both chromatic and spherical aberration. It does not image on the retina simultaneously sharp the object in the foreground, in the middle distance and in the background and consequently there is a strong perception of depth in the field of view even with monocular vision.

To give a photographic picture pictorial verisimilitude has required a photographic lens designed to produce an approximately correct representation of objects in three dimensions such as the eye sees them. Such lenses are in large use by artistic photographers and are so designed and proportioned as to soften the focal images by the introduction of chromatic or spherical aberration or both in such wise as to present an appearance of solidity and extension resembling that perceived by the eye. The outlines are no longer hard and objects at a distance, without giving the appearance of being out of focus, are softened in outline and given a pictorial value which they would not possess were they either distinctly out of focus or as sharp in contour as if they were in a nearer plane of view.

Our present invention consists in an auxiliary lens system which may contain one or several components adapted to be mounted in the axis of an ordinary lens like an anastigmat to introduce in the image without change of its ordinary focal plane a diffusion of the focus which enables the combination to produce the pictorial results heretofore obtained by the employement of so-called soft focus lenses. It thereby enables the photographer at will to produce either precise point to point representations of objects in a plane conjugate to the plate or true pictorial photographs giving a perception of depth and solidity.

To this end we provide a lens structure which in itself is substantially of zero power and which therefore does not change materially the back focus of the lens to which it is applied. Our improved lens is however constructed so that while it does not change the ordinary focus and hence permits the ordinary focussing scale of a hand camera to be used with precision or the image to be focussed on the ground glass in the ordinary way by visual rays, introduces sufficient chromatic and spherical difference of focus to soften the contour of the resulting image in the way hereinbefore described. The construction of our improved lens and its adaptation in the manner described is shown in the accompanying drawings, throughout which like reference characters are employed to indicate corresponding parts. In the drawings:

Fig. I shows a compound lens in which *a* is of flint glass and $b$ of compensating power when combined therewith, is of crown glass.

Fig. II shows a single thick lens of either crown or flint glass of which the two curvatures are so related as to produce again for visual rays zero power.

Fig. III shows the effect of the combination of such lens of zero power in modifying the focus of the combination, and Fig. IV shows a plan of our apparatus as attached to the ordinary hand camera with its focussing scale.

In Fig. I the bright visual rays $r$ emerge from lens $b$ substantially parallel to their original directions as at $r^1$ while the rays $r^2$ more active photographically, diverge as at $r^3$ more and more progressively as they are of higher refractivity, the amount of divergence in this case being due to the resultant refractive effect of the flint glass concave lens and the crown glass convex lens. By reason of the irrationality of dispersion between these two lenses it is possible within limits to regulate the disposition of the photographic rays for which the combination acts as a diverging lens. Similarly if an abnormal pair of glasses is used and the convex component is of the higher dispersion, the resulting system acts as a converging lens for rays more refrangible than the ray for which zero power is determined.

In Fig. II a similar regulation can be attained by varying the character of the glass and the thickness of the lens. Owing to the thickness the curvatures $a^2$ and $a^3$ of the two sides must be different and coact in producing zero power only in the case of some predetermined wave length chosen generally as that corresponding to visual focus, while the lens is diverging as respects the more refrangible rays. In Fig. II we have illustrated at the line W a beam incident on the meniscus form of the lens. The beam is split into its yellow green component which emerges substantially parallel, while its violet component indicated in dotted lines departing from a surface of different curvature is thrown in slightly more towards the axis. In the particular form indicated in this application, the meniscus while thinner in the center than at the rim, in virtue of its thickness is slightly converging for rays of certain refrangibility, and neither converging or diverging for rays of intermediate refrangibility. The form is meniscus. The function for the same form may be either converging or diverging or passed through the limiting case, between.

The result of these constructions is typified in Fig. III, where $a\,b$ is our modifying lens, as shown in Fig. I; $b^1$, $b^2$ and $b^3$ the lenses of a typical anastigmatic combination, and $c$ the normal focal plane thereof. The divergent photographic rays produced by $a\,b$ as illustrated in Fig. I act with respect to the anastigmat $b^1$, $b^2$, $b^3$, as if they proceeded from a front conjugate focus instead of from an infinity and hence according to their respective refractive indexes they come into progressively displaced focal planes between, for example, $c$ and $c^1$. Thus they form not a single focal plane for the rays which affect the plate, but a focal volume distributed between the planes $c$ and $c^1$ so that the contours of the image actually impressed on the plate are shaded off to produce the desired effect without the production of any single image with respect to which the shading is visibly out of focus. As hereinbefore indicated, by a suitable choice of glasses in the form shown in Fig. I, the focal volume may be shifted forward toward $c^2$ instead of backward toward $c$. The simple and generally preferred form, Fig. II, which shortens slightly the focus for the notably actinic rays, has the effect here indicated of shifting the focal volume toward $c^2$. In Fig. I the glasses are so positioned that the more frangible rays are slightly diverging. In either case there is blending of the spherical aberration and chromatic difference thereof to an extent controllable within limits by varying the material and curvatures of the modifying lens.

When our modifying lens is suitably designed and proportioned it accomplishes this result without a falling off of the quality of the image near the margin of the plate and without requiring stopping down of the anastigmat $b^1$, $b^2$ and $b^3$ from its full aperture.

As an example of the construction of our lens producing results here described we have found satisfactory result attained by making lens $a$ Fig. I of flint glass of refractive index for D 1.616 with a curvature of 18.7 diopters to a rear or contact curvature of 26.75 d. The corresponding crown lens has its contact surface of 26.75 d. for a refractive index for D of 1.523, and a rear curvature of 17.25 d.

In Fig. IV 1 is the body of the camera and 2 the lens mount. Our modifying lens 3 is detachably affixed thereto by a set screw 5. The focussing scale 4 remains unchanged whether the lens 3 is on or off. The scale is preferably graduated for foci corresponding to infinity up to about 6 feet. We do not confine ourselves to the proportions or materials here described, since the essential requirements of a modifying lens of zero power for ordinary visual rays and distributing the photographically active rays in a restricted focal volume of predetermined extent may be obtained by other proportions and construction discernible to those skilled in the art.

Various modifications in the form and construction of our device may obviously be resorted to, all without departing from the spirit of our invention if within the limits of the appended claims.

What we therefore claim and desire to secure by Letters Patent is:—

1. An auxiliary lens adapted for use with a sharp focus camera lens of substantially zero focal power for the brighter visible rays and of distributive negative power for rays photographically active.

2. A lens of homogeneous material having the curvature of its faces so related that it is of zero refractive power for rays of a predetermined wave length and of progressively varying power for rays of greater refractivities than those of said predetermined wave length.

3. A thick meniscus lens of so-called negative form of which the respective faces of curvatures and the indexes of refraction are such that when combined with the lens thickness no deviation is produced for parallel rays of a predetermined wave length, while waves of other defined wave lengths are refracted by said lens.

4. In combination with a photographic lens, of itself producing sharp images, a lens of zero power with respect to predetermined visual rays and dispersive power with respect to rays of greater photographic activity.

5. In combination with a photographic lens of itself giving sharp images, a modifying lens of zero combinational focal power for visual rays and of dispersive power for rays of a predetermined shorter wave length to produce a predetermined focal volume correlated with the normal focal plane of said lens.

6. A lens of zero power for parallel incident light of a predetermined wave length and so proportioned as to produce for rays of other wave length chromatic difference of focus and of spherical aberration.

7. In combination in a camera, a photographic lens and a modifying lens mounted axially thereto which lens leaves unchanged the back focal length of said photographic lens for predetermined visual rays, while distributing the focus for other rays in virtue of chromatic difference of focus and of spherical aberration.

8. A soft focus modifying lens comprising a thick meniscus of highly dispersive glass of substantially zero power for visual rays for predetermined wave length.

In testimony whereof we affix our signatures in presence of two witnesses.

LOUIS BELL.
WALTER G. WOLFE.

Witnesses:
EIFFEL B. GALE,
GEO. B. RAWLINGS.